（12) United States Patent
Musoll et al.

(10) Patent No.: US 9,582,215 B2
(45) Date of Patent: Feb. 28, 2017

(54) PACKET PROCESSING SYSTEM, METHOD AND DEVICE UTILIZING MEMORY SHARING

(71) Applicant: CAVIUM, INC., San Jose, CA (US)

(72) Inventors: Enrique Musoll, San Jose, CA (US); Weihuang Wang, Los Gatos, CA (US)

(73) Assignee: Cavium, Inc., San Jose, CA (US)

( * ) Notice: Subject to any disclaimer, the term of this patent is extended or adjusted under 35 U.S.C. 154(b) by 100 days.

(21) Appl. No.: 14/673,835

(22) Filed: Mar. 30, 2015

(65) Prior Publication Data

US 2016/0291895 A1    Oct. 6, 2016

(51) Int. Cl.

| G06F 9/00 | (2006.01) |
|---|---|
| G06F 3/00 | (2006.01) |
| G06F 3/06 | (2006.01) |
| H04L 29/08 | (2006.01) |
| H04L 12/54 | (2013.01) |
| G06F 9/50 | (2006.01) |
| G06F 9/455 | (2006.01) |

(52) U.S. Cl.
CPC ........... *G06F 3/0635* (2013.01); *G06F 3/0604* (2013.01); *G06F 3/0631* (2013.01); *G06F 3/0673* (2013.01); *G06F 9/5016* (2013.01); *H04L 12/56* (2013.01); *H04L 29/08171* (2013.01); *G06F 9/505* (2013.01); *G06F 2009/45583* (2013.01)

(58) Field of Classification Search
None
See application file for complete search history.

(56) References Cited

U.S. PATENT DOCUMENTS

| 9,154,441 B2* | 10/2015 | Matthews | H04L 47/6255 |
|---|---|---|---|
| 2002/0083233 A1* | 6/2002 | Owen | H04L 47/10 710/60 |
| 2002/0126673 A1* | 9/2002 | Dagli | H04L 47/10 370/392 |
| 2003/0177293 A1* | 9/2003 | Bilak | H04L 49/9047 710/56 |
| 2004/0042490 A1* | 3/2004 | Henderson | H04L 49/254 370/469 |
| 2004/0130961 A1* | 7/2004 | Kuo | G11C 7/1042 365/230.03 |
| 2005/0025140 A1* | 2/2005 | Deforche | H04L 12/5693 370/363 |
| 2005/0125590 A1* | 6/2005 | Li | G06F 13/4027 710/317 |
| 2006/0256793 A1* | 11/2006 | Swartzentruber | H04L 49/90 370/394 |
| 2007/0086428 A1* | 4/2007 | Lai | H04L 49/103 370/351 |
| 2007/0280277 A1* | 12/2007 | Lund | H04L 49/205 370/412 |

* cited by examiner

*Primary Examiner* — Kaushikkumar Patel
(74) *Attorney, Agent, or Firm* — Haverstock & Owens LLP (57) ABSTRACT

A packet processing system having a control path memory of a control path subsystem and a datapath memory of a datapath subsystem. The datapath subsystem stores packet data of incoming packets and the control path subsystem performs matches of a subset of packet data, or a hash of the packet data, against the contents of a the control path memory in order to process the packets. The packet processing system enabling a portion of the datapath memory to be used by the control subsystem if needed or a portion of the control path memory to be used by the datapath subsystem if needed.

45 Claims, 3 Drawing Sheets

PACKET PROCESSING SYSTEM, METHOD AND DEVICE UTILIZING MEMORY SHARING

FIELD OF INVENTION

The present invention relates to a packet processing system. More particularly, the present invention relates to a packet processing system having a datapath memory and a control path memory that optionally share memory space.

BACKGROUND OF THE INVENTION

A packet-processing device, like a switch microchip, generally operates by inputting packets, storing the packet data, processing a portion of the packet data and modifying and/or outputting the packet data based on the processing. The device comprises a datapath memory (or packet memory) of a datapath subsystem that is used to store/buffer the packet data while the packet is being processed and a control path memory (or search memory) of a control path subsystem used to store the data used to process the packet. However, often these two subsystems are independent such that each is only able to use its own memory regardless of how the memory of the other subsystem is being utilized. As a result, this independent memory partition between the two subsystems can lead to overall memory usage inefficiency of the device if one of the subsystems does not need all the memory space available in its memory but the other subsystems could use more memory space than it is available in its memory. For example, if the switch device is deployed close to the edge of a processing network (e.g. data center network), it is expected that more packet buffering within the datapath memory and fewer search tables within the control path memory are needed. On the contrary, if the device is deployed close to the core of the network, the opposite may be true. Thus, the efficiency of the use of memory on the device is not optimized.

BRIEF SUMMARY OF THE INVENTION

A packet processing system having a control path memory of a control path subsystem and a datapath memory of a datapath subsystem. The datapath subsystem stores packet data of incoming packets and the control path subsystem performs matches of a subset of packet data, or a hash of the packet data, against the contents of a the control path memory in order to process the packets. The packet processing system enabling a portion of the datapath memory to be used by the control subsystem if needed or a portion of the control path memory to be used by the datapath subsystem if needed.

A first aspect is directed to a packet processing system on a packet processing device. The system comprises a datapath subsystem including datapath logic and a non-transitory computer-readable datapath memory that is communicatively coupled with the datapath logic and logically organized into a plurality of memory banks, wherein the datapath logic controls the writing of datapath packet data into and the reading of the datapath packet data out of the datapath memory, a control path subsystem including control path logic and a non-transitory computer-readable control path memory that is communicatively coupled with the control path logic and logically organized into a plurality of control memory pools that each comprise a plurality of tiles, wherein the control path logic controls the writing of control path packet data into and the reading of the control path packet data out of the control path memory and a memory allocation element having a datapath unit communicatively coupled with the datapath subsystem and a control path unit communicatively coupled with the control path subsystem, wherein the control path unit is configured to allocate a portion of the datapath memory to the control path subsystem such that the portion of the datapath memory is used by the control path subsystem to store the control path packet data and the datapath unit is configured to allocate a portion of the control path memory to the datapath subsystem such that the portion of the control path memory is used by the datapath subsystem to store the datapath packet data. In some embodiments, if the portion of the control path memory is allocated to the datapath subsystem, the control path logic is configured to facilitate the writing of datapath packet data into and the reading of the datapath packet data out of the portion of the control path memory, and if the portion of the datapath memory is allocated to the control path subsystem, the datapath logic is configured to facilitate the writing of control path packet data into and the reading of the control path packet data out of the portion of the datapath memory. In some embodiments, the memory allocation element ensures that the portion of the control path memory and the portion of the datapath memory are never both allocated concurrently. In some embodiments, the portion of the datapath memory is one or more of the memory banks of the datapath memory. In some embodiments, the memory banks are logically divided into a plurality of pages that each span two or more of the memory banks, and further wherein the portion of the datapath memory is one or more of the pages of the datapath memory.

In some embodiments, the system further comprises one or more buses communicatively coupling the datapath logic to the control path logic, wherein both communicating with the datapath logic by the control path logic to use the portion of the datapath memory and communicating with the control path logic by the datapath logic to use the portion of the control path memory is performed over the buses. In some embodiments, once the portion of the datapath memory is allocated to the control path subsystem, the control path subsystem treats the portion of the datapath memory as one or more additional control memory pools. In some embodiments, once the portion of the control path memory is allocated to the data path subsystem, the data path subsystem treats the portion of the control path memory as one or more additional memory banks within the datapath memory or treats the portion of the control path memory as one or more additional pages within one or more of the memory banks. In some embodiments, the system further comprises a configuration register that stores memory configuration data indicating which if any of the control path memory is allocated to the datapath subsystem and which if any of the datapath memory is allocated to the control path subsystem. In some embodiments, if the portion of the control path memory is allocated to the datapath subsystem, the datapath logic is configured to only utilize the portion of control path memory to store the datapath packet data if the datapath packet data is not able to be stored on the datapath memory. In some embodiments, if the portion of the datapath memory is allocated to the control path subsystem, the control path logic is configured to only utilize the portion of the datapath memory to store the control path packet data if the control path packet data is not able to be stored on the control path memory. In some embodiments, once the portion of the datapath memory is allocated to the control path subsystem, the datapath logic is unable to use the portion of the datapath memory for storing the datapath packet data and once the portion of the control path memory is allocated to the datapath subsystem, the control path logic is unable to use the portion of the control path memory for storing the control path packet data. In some embodiments, even while the portion of the datapath memory is allocated to the control path subsystem, the datapath logic is configured to overwrite some or all of the control path packet data stored on the portion of the datapath memory if the portion of the datapath memory is necessary to store some or all of the datapath packet data and even while the portion of the control path memory is allocated to the datapath subsystem, the control path logic is configured to overwrite some or all of the datapath packet data stored on the portion of the control path memory if the portion of the control path memory is necessary to store some or all of the control path packet data.

In some embodiments, the system further comprises a datapath memory availability line and a control path memory availability line that are each coupled between the control path subsystem and the datapath subsystem, wherein the datapath logic indicates to the control path logic if the portion of the datapath memory is currently in use by the datapath subsystem via the datapath memory availability line and the control path logic indicates to the datapath logic if the portion of the control path memory is currently in use by the control path subsystem via the control path memory availability line. In some embodiments, if the datapath logic overwrites the some or all of the control path packet data stored on the portion of the datapath memory, the datapath logic indicates to the control path logic that the portion of the datapath memory is currently in use by the datapath subsystem via the datapath memory availability line and the control path logic operates as if the some or all of the control path packet data has all been deleted, and if the control path logic overwrites the some or all of the datapath packet data stored on the portion of the control path memory, the control path logic indicates to the datapath logic that the portion of the control path memory is currently in use by the control path subsystem via the control path memory availability line and the datapath logic operates as if the some or all of the datapath packet data has all been deleted. In some embodiments, the datapath logic is configured to maintain tags identifying which of the datapath packet data is stored on the portion of the control path memory. In some embodiments, the control path unit and the datapath unit operate independently of each other.

A second aspect is directed to a memory allocation element stored on a non-transitory computer readable medium of a packet processing device, the memory allocation element having a control path unit configured to allocate a portion of a non-transitory computer-readable datapath memory to a control path subsystem such that the portion of the datapath memory is used by the control path subsystem to store control path packet data and a datapath unit configured to allocate a portion of a non-transitory computer-readable control path memory to a datapath subsystem such that the portion of the control path memory is used by a datapath subsystem to store datapath packet data, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory. In some embodiments, the memory allocation element ensures that the portion of the control path memory and the portion of the datapath memory are never both allocated concurrently. In some embodiments, the element further comprises a configuration register that stores memory configuration data indicating which if any of the control path memory is allocated to the datapath subsystem and which if any of the datapath memory is allocated to the control path subsystem. In some embodiments, the datapath logic indicates to the control path logic if the portion of the datapath memory is currently in use by the datapath subsystem and the control path logic indicates to the datapath logic if the portion of the control path memory is currently in use by the control path subsystem, and further wherein upon request for more memory space by the datapath subsystem, the datapath unit of the memory allocation element does not allocate the portion of the control path memory if the control path logic indicates that the portion of the control path memory is currently in use, and further wherein upon request for more memory space by the control path subsystem, the control path unit of the memory allocation element does not allocate the portion of the datapath memory if the datapath logic indicates that the portion of the datapath memory is currently in use. In some embodiments, once the portion of the datapath memory is allocated to the control path subsystem, the datapath logic is unable to use the portion of the datapath memory for storing the datapath packet data and once the portion of the control path memory is allocated to the datapath subsystem, the control path logic is unable to use the portion of the control path memory for storing the control path packet data. In some embodiments, even while the portion of the datapath memory is allocated to the control path subsystem, the datapath logic is configured to overwrite some or all of the control path packet data stored on the portion of the datapath memory if the portion of the datapath memory is necessary to store some or all of the datapath packet data and even while the portion of the control path memory is allocated to the datapath subsystem, the control path logic is configured to overwrite some or all of the datapath packet data stored on the portion of the control path memory if the portion of the control path memory is necessary to store some or all of the control path packet data. In some embodiments, the control path unit and the datapath unit operate independently of each other.

A third aspect is directed to a method of operating a packet processing system on a packet processing device. The method comprises writing datapath packet data into and reading the datapath packet data out of a non-transitory computer readable datapath memory with datapath logic within a datapath subsystem, wherein the datapath memory is communicatively coupled with the datapath logic and logically organized into a plurality of memory banks, writing control path packet data into and reading the control path packet data out of a non-transitory computer readable control path memory with control path logic within a control path subsystem, wherein the control path memory is communicatively coupled with the control path logic and logically organized into a plurality of control memory pools that each comprise a plurality of tiles and allocating, with a memory allocation element having a datapath unit and a control path unit, either a portion of the datapath memory to the control path subsystem with the control path unit such that the portion of the datapath memory is used by the control path subsystem to store the control path packet data or a portion of the control path memory to the datapath subsystem with the datapath unit such that the portion of the control path memory is used by the datapath subsystem to store the datapath packet data, wherein the datapath unit is communicatively coupled with the datapath subsystem and the control path unit is communicatively coupled with the control path subsystem. In some embodiments, the method further comprises facilitating the writing of datapath packet data into and the reading of the datapath packet data out of the portion of the control path memory the control path logic if the portion of the control path memory is allocated to the datapath subsystem, and facilitating the writing of control path packet data into and the reading of the control path packet data out of the portion of the datapath memory with the datapath logic if the portion of the datapath memory is allocated to the control path subsystem. In some embodiments, the method further comprises ensuring that the portion of the control path memory and the portion of the datapath memory are never both allocated concurrently with the memory allocation element. In some embodiments, the portion of the datapath memory is one or more of the memory banks of the datapath memory. In some embodiments, the memory banks are logically divided into a plurality of pages that each span two or more of the memory banks, and further wherein the portion of the datapath memory is one or more of the pages of the datapath memory. In some embodiments, one or more buses communicatively couple the datapath logic to the control path logic, the method further comprising communicating over the buses with the datapath logic with the control path logic to use the portion of the datapath memory and communicating over the buses with the control path logic with the datapath logic to use the portion of the control path memory. In some embodiments, the method further comprises treating the portion of the datapath memory as one or more additional control memory pools with the control path subsystem once the portion of the datapath memory is allocated to the control path subsystem. In some embodiments, the method further comprises treating the portion of the control path memory as one or more additional memory banks within the datapath memory or treating the portion of the control path memory as one or more additional pages within one or more of the memory banks with the data path subsystem once the portion of the control path memory is allocated to the data path subsystem. In some embodiments, the method further comprises storing memory configuration data on a configuration register, the memory configuration data indicating which if any of the control path memory is allocated to the datapath subsystem and which if any of the datapath memory is allocated to the control path subsystem.

In some embodiments, the method further comprises only utilizing the portion of control path memory to store the datapath packet data with the datapath logic if the datapath packet data is not able to be stored on the datapath memory if the portion of the control path memory is allocated to the datapath subsystem. In some embodiments, the method further comprises only utilizing the portion of the datapath memory to store the control path packet data with the control path logic if the control path packet data is not able to be stored on the control path memory if the portion of the datapath memory is allocated to the control path subsystem. In some embodiments, the method further comprises refraining from using the portion of the datapath memory for storing the datapath packet data with the datapath logic once the portion of the datapath memory is allocated to the control path subsystem, and refraining from using the portion of the control path memory for storing the control path packet data with the control path logic once the portion of the control path memory is allocated to the datapath subsystem. In some embodiments, the method further comprises overwriting some or all of the control path packet data stored on the portion of the datapath memory if the portion of the datapath memory is necessary to store some or all of the datapath packet data some or all of the control path packet data stored on the portion of the datapath memory if the portion of the datapath memory is necessary to store some or all of the datapath packet data with the datapath logic even while the portion of the datapath memory is allocated to the control path subsystem, and overwriting some or all of the datapath packet data stored on the portion of the control path memory if the portion of the control path memory is necessary to store some or all of the control path packet data with the control path logic even while the portion of the control path memory is allocated to the datapath subsystem. In some embodiments, a datapath memory availability line and a control path memory availability line are each coupled between the control path subsystem and the datapath subsystem, the method further comprising indicating to the control path logic with the datapath logic if the portion of the datapath memory is currently in use by the datapath subsystem via the datapath memory availability line, and indicating to the datapath logic with the control path logic if the portion of the control path memory is currently in use by the control path subsystem via the control path memory availability line. In some embodiments, the method further comprises, if the datapath logic overwrites the some or all of the control path packet data stored on the portion of the datapath memory, indicating to the control path logic with the datapath logic that the portion of the datapath memory is currently in use by the datapath subsystem via the datapath memory availability line and operating with the control path logic as if the some or all of the control path packet data has all been deleted, and, if the control path logic overwrites the some or all of the datapath packet data stored on the portion of the control path memory, indicating to the datapath logic with the control path logic that the portion of the control path memory is currently in use by the control path subsystem via the control path memory availability line and operating with the datapath logic as if the some or all of the datapath packet data has all been deleted. In some embodiments, the method further comprises maintaining tags identifying which of the datapath packet data is stored on the portion of the control path memory with the datapath logic. In some embodiments, the control path unit and the datapath unit operate independently of each other.

A fourth aspect is directed to a method of operating a memory allocation element having a datapath unit and a control path unit within a packet processing system on a packet processing device. The method comprises allocating either a portion of a non-transitory computer readable datapath memory to a control path subsystem with the control path unit such that the portion of the datapath memory is used by the control path subsystem to store control path packet data or a portion of a non-transitory computer readable control path memory to a datapath subsystem with the datapath unit such that the portion of the control path memory is used by the datapath subsystem to store datapath packet data, wherein the datapath unit is communicatively coupled with the datapath subsystem and the control path unit is communicatively coupled with the control path subsystem, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory. In some embodiments, the method further comprises ensuring that the portion of the control path memory and the portion of the datapath memory are never both allocated concurrently with the memory allocation element. In some embodiments, the method further comprises storing memory configuration data on a configuration register, the memory configuration data indicating which if any of the control path memory is allocated to the datapath subsystem and which if any of the datapath memory is allocated to the control path subsystem. In some embodiments, the datapath logic indicates to the control path logic if the portion of the datapath memory is currently in use by the datapath subsystem and the control path logic indicates to the datapath logic if the portion of the control path memory is currently in use by the control path subsystem, the method further comprising, upon request for more memory space by the datapath subsystem, refraining from allocating the portion of the control path memory if the control path logic indicates that the portion of the control path memory is currently in use, and, upon request for more memory space by the control path subsystem, refraining from allocating the portion of the datapath memory if the datapath logic indicates that the portion of the datapath memory is currently in use. In some embodiments, the control path unit and the datapath unit operate independently of each other.

A fifth aspect is directed to a datapath subsystem. The datapath subsystem comprises a non-transitory computer-readable datapath memory logically organized into a plurality of memory banks for storing datapath packet data and datapath logic communicatively coupled with the datapath memory, wherein the datapath logic controls the writing of the datapath packet data into and the reading of the datapath packet data out of the datapath memory, and further wherein the datapath logic transmits a request for a portion of a control path memory to a datapath unit of a memory allocation element when a quantity of the datapath memory that is currently storing the datapath packet data reaches a threshold value, wherein the control path memory is a part of a control path subsystem including control path logic that controls the writing of control path packet data into and the reading of the control path packet data out of the control path memory. In some embodiments, if the portion of the control path memory is allocated to the datapath subsystem by the datapath unit of the memory allocation element, the datapath logic sends write and read datapath commands to the control path logic in order to write the datapath packet data into and read out the datapath packet data from the portion of the control path memory. In some embodiments, if the datapath logic is notified by the datapath unit of the memory allocation element that a portion of the datapath memory has been allocated to the control path subsystem, the datapath logic facilitates the writing of the control path packet data into and the reading of the control path packet data out of the portion of the datapath memory based on control path commands received from the control path logic. In some embodiments, the portion of the datapath memory is one or more of the memory banks of the datapath memory. In some embodiments, the memory banks are logically divided into a plurality of pages that each span two or more of the memory banks, and further wherein the portion of the datapath memory is one or more of the pages of the datapath memory.

In some embodiments, once the portion of the control path memory is allocated to the data path subsystem, the data path subsystem treats the portion of the control path memory as one or more additional memory banks within the datapath memory or treats the portion of the control path memory as one or more additional pages within one or more of the memory banks. In some embodiments, the threshold value is equal to an entirety of the datapath memory. In some embodiments, the subsystem further comprises a configuration register that stores memory configuration data indicating which if any of the control path memory is allocated to the datapath subsystem and which if any of the datapath memory is allocated to the control path subsystem. In some embodiments, if the portion of the control path memory is allocated to the datapath subsystem, the datapath logic is configured to only utilize the portion of control path memory to store the datapath packet data if the datapath packet data is not able to be stored on the datapath memory. In some embodiments, if the datapath logic is notified by the datapath unit of the memory allocation element that a portion of the datapath memory has been allocated to the control path subsystem, the datapath logic refrains from using the portion of the datapath memory for storing the datapath packet data. In some embodiments, even if the datapath logic is notified by the datapath unit of the memory allocation element that a portion of the datapath memory has been allocated to the control path subsystem, the datapath logic is configured to overwrite some or all of the control path packet data stored on the portion of the datapath memory if the portion of the datapath memory is necessary to store some or all of the datapath packet data. In some embodiments, the datapath logic transmits a datapath memory signal to the control path logic indicating if the portion of the datapath memory is currently in use by the datapath subsystem. In some embodiments, the datapath logic monitors for a control path memory signal received from the control path logic that indicates if the portion of the control path memory is currently in use by the control path subsystem. In some embodiments, if the datapath logic overwrites the some or all of the control path packet data stored on the portion of the datapath memory, the datapath logic indicates to the control path logic that the portion of the datapath memory is currently in use by the datapath subsystem such that the control path logic is able to operate as if the some or all of the control path packet data has all been deleted. In some embodiments, the datapath logic is configured to maintain tags identifying which of the datapath packet data is stored on the portion of the control path memory.

A sixth aspect is directed to a method of operating a datapath subsystem within a packet processing system on a packet processing device. The method comprises writing datapath packet data into and reading the datapath packet data out of a non-transitory computer readable datapath memory with datapath logic, wherein the datapath memory is communicatively coupled with the datapath logic and logically organized into a plurality of memory banks and transmitting a request for a portion of a non-transitory computer readable control path memory to a datapath unit of a memory allocation element when a quantity of the datapath memory that is currently storing the datapath packet data reaches a threshold value, wherein the control path memory is a part of a control path subsystem including control path logic that controls the writing of control path packet data into and the reading of the control path packet data out of the control path memory. In some embodiments, the method further comprises, if the portion of the control path memory is allocated to the datapath subsystem by the datapath unit of the memory allocation element, sending write and read datapath commands the datapath logic to the control path logic in order to write the datapath packet data into and read out the datapath packet data from the portion of the control path memory. In some embodiments, the method further comprises, if the datapath logic is notified by the datapath unit of the memory allocation element that a portion of the datapath memory has been allocated to the control path subsystem, facilitating with the datapath logic the writing of the control path packet data into and the reading of the control path packet data out of the portion of the datapath memory based on control path commands received from the control path logic. In some embodiments, the portion of the datapath memory is one or more of the memory banks of the datapath memory. In some embodiments, the memory banks are logically divided into a plurality of pages that each span two or more of the memory banks, and further wherein the portion of the datapath memory is one or more of the pages of the datapath memory. In some embodiments, the method further comprises, once the portion of the control path memory is allocated to the data path subsystem, the datapath logic treating the portion of the control path memory as one or more additional memory banks within the datapath memory or treating the portion of the control path memory as one or more additional pages within one or more of the memory banks. In some embodiments, the threshold value is equal to an entirety of the datapath memory. In some embodiments, the method further comprises, if the portion of the control path memory is allocated to the datapath subsystem, only utilizing with the datapath logic the portion of control path memory to store the datapath packet data if the datapath packet data is not able to be stored on the datapath memory. In some embodiments, the method further comprises, if the datapath logic is notified by the datapath unit of the memory allocation element that a portion of the datapath memory has been allocated to the control path subsystem, refraining from using the portion of the datapath memory for storing the datapath packet data with the datapath logic. In some embodiments, the method further comprises, even if the datapath logic is notified by the datapath unit of the memory allocation element that a portion of the datapath memory has been allocated to the control path subsystem, overwriting some or all of the control path packet data stored on the portion of the datapath memory with the datapath logic if the portion of the datapath memory is necessary to store some or all of the datapath packet data. In some embodiments, the method further comprises transmitting with the datapath logic a datapath memory signal to the control path logic indicating if the portion of the datapath memory is currently in use by the datapath subsystem. In some embodiments, the method further comprises monitoring with the datapath logic for a control path memory signal received from the control path logic that indicates if the portion of the control path memory is currently in use by the control path subsystem. In some embodiments, the method further comprises, if the datapath logic overwrites the some or all of the control path packet data stored on the portion of the datapath memory, indicating to the control path logic with the datapath logic that the portion of the datapath memory is currently in use by the datapath subsystem such that the control path logic is able to operate as if the some or all of the control path packet data has all been deleted. In some embodiments, the method further comprises maintain tags identifying which of the datapath packet data is stored on the portion of the control path memory with the datapath logic.

A seventh aspect is directed to a control path subsystem. The control path subsystem comprises a non-transitory computer-readable control path memory logically organized into a plurality of control memory pools that each comprise a plurality of tiles and control path logic communicatively coupled with the control path memory, wherein the control path logic controls the writing of the control path packet data into and the reading of the control path packet data out of the control path memory, and further wherein the control path logic transmits a request for a portion of a datapath memory to a control path unit of a memory allocation element when a quantity of the control path memory that is currently storing the control path packet data reaches a threshold value, wherein the datapath memory is a part of a datapath subsystem including datapath logic that controls the writing of datapath packet data into and the reading of the datapath packet data out of the datapath memory. In some embodiments, if the portion of the datapath memory is allocated to the control path subsystem by the control path unit of the memory allocation element, the control path logic sends write and read control path commands to the datapath logic in order to write the control path packet data into and read out the control path packet data from the portion of the datapath memory. In some embodiments, if the control path logic is notified by the control path unit of the memory allocation element that a portion of the control path memory has been allocated to the datapath subsystem, the control path logic facilitates the writing of the datapath packet data into and the reading of the datapath packet data out of the portion of the control path memory based on control path commands received from the datapath logic. In some embodiments, the portion of the control path memory is one or more of the control memory pools of the control path memory. In some embodiments, once the portion of the datapath memory is allocated to the control path subsystem, the control path subsystem treats the portion of the datapath memory as one or more additional control memory pools within the control path memory. In some embodiments, the threshold value is equal to an entirety of the control path memory. In some embodiments, the subsystem further comprises a configuration register that stores memory configuration data indicating which if any of the control path memory is allocated to the datapath subsystem and which if any of the datapath memory is allocated to the control path subsystem. In some embodiments, if the portion of the datapath memory is allocated to the control path subsystem, the control path logic is configured to only utilize the portion of datapath memory to store the control path packet data if the control path packet data is not able to be stored on the control path memory. In some embodiments, if the control path logic is notified by the control path unit of the memory allocation element that a portion of the control path memory has been allocated to the datapath subsystem, the control path logic refrains from using the portion of the control path memory for storing the control path packet data. In some embodiments, even if the control path logic is notified by the control path unit of the memory allocation element that a portion of the control path memory has been allocated to the datapath subsystem, the control path logic is configured to overwrite some or all of the datapath packet data stored on the portion of the control path memory if the portion of the control path memory is necessary to store some or all of the control path packet data. In some embodiments, the control path logic transmits a control path memory signal to the datapath logic indicating if the portion of the control path memory is currently in use by the control path subsystem. In some embodiments, the control path logic monitors for a datapath memory signal received from the datapath logic that indicates if the portion of the datapath memory is currently in use by the datapath subsystem. In some embodiments, if the control path logic overwrites the some or all of the datapath packet data stored on the portion of the control path memory, the control path logic indicates to the datapath logic that the portion of the control path memory is currently in use by the control path subsystem such that the datapath logic is able to operate as if the some or all of the datapath packet data has all been deleted.

An eighth aspect is directed to a method of operating a control path subsystem within a packet processing system on a packet processing device. The method comprises writing control path packet data into and reading the control path packet data out of a non-transitory computer readable control path memory with control path logic, wherein the control path memory is communicatively coupled with the control path logic and logically organized into a plurality of control memory pools that each comprise a plurality of tiles and transmitting a request for a portion of a non-transitory computer readable datapath memory to a control path unit of a memory allocation element when a quantity of the control path memory that is currently storing the control path packet data reaches a threshold value, wherein the datapath memory is a part of a datapath subsystem including datapath logic that controls the writing of datapath packet data into and the reading of the datapath packet data out of the datapath memory. In some embodiments, the method further comprises, if the portion of the datapath memory is allocated to the control path subsystem by the control path unit of the memory allocation element, sending write and read control path commands to the datapath logic with the control path logic in order to write the control path packet data into and read out the control path packet data from the portion of the datapath memory. In some embodiments, the method further comprises, if the control path logic is notified by the control path unit of the memory allocation element that a portion of the control path memory has been allocated to the datapath subsystem, facilitating the writing of the datapath packet data into and the reading of the datapath packet data out of the portion of the control path memory with the control path logic based on control path commands received from the datapath logic. In some embodiments, the portion of the control path memory is one or more of the control memory pools of the control path memory. In some embodiments, the method further comprises, once the portion of the datapath memory is allocated to the control path subsystem, treating the portion of the datapath memory as one or more additional control memory pools within the control path memory with the control path logic. In some embodiments, the threshold value is equal to an entirety of the control path memory. In some embodiments, the method further comprises storing memory configuration data indicating which if any of the control path memory is allocated to the datapath subsystem and which if any of the datapath memory is allocated to the control path subsystem. In some embodiments, the method further comprises, if the portion of the datapath memory is allocated to the control path subsystem, only utilizing the portion of datapath memory to store the control path packet data with the control path logic if the control path packet data is not able to be stored on the control path memory. In some embodiments, the method further comprises, if the control path logic is notified by the control path unit of the memory allocation element that a portion of the control path memory has been allocated to the datapath subsystem, refraining from using the portion of the control path memory for storing the control path packet data with the control path logic. In some embodiments, the method further comprises, even if the control path logic is notified by the control path unit of the memory allocation element that a portion of the control path memory has been allocated to the datapath subsystem, overwriting some or all of the datapath packet data stored on the portion of the control path memory with the control path logic if the portion of the control path memory is necessary to store some or all of the control path packet data. In some embodiments, the method further comprises transmitting a control path memory signal to the datapath logic indicating with the control path logic if the portion of the control path memory is currently in use by the control path subsystem. In some embodiments, the method further comprises monitoring with the control path logic for a datapath memory signal received from the datapath logic that indicates if the portion of the datapath memory is currently in use by the datapath subsystem. In some embodiments, the method further comprises, if the control path logic overwrites the some or all of the datapath packet data stored on the portion of the control path memory, indicating to the datapath logic with the control path logic that the portion of the control path memory is currently in use by the control path subsystem such that the datapath logic is able to operate as if the some or all of the datapath packet data has all been deleted.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a packet processing system having a control path memory of a control path subsystem and a datapath memory of a datapath subsystem. The datapath subsystem stores packet data of incoming packets and the control path subsystem performs matches of a subset of packet data, or a hash of the packet data, against the contents of a the control path memory in order to process the packets. The packet processing system enabling a portion of the datapath memory to be used by the control subsystem if needed or a portion of the control path memory to be used by the datapath subsystem if needed. As a result, the system provides the advantage of dynamically or statically improving the performance of the system by either allowing more packets to be buffered within the datapath memory (minimizing packet drops and/or throttling to the sender of packets) or more rules to be matched against within the control path memory (allowing more features to be implemented in the system).

Figure 1:
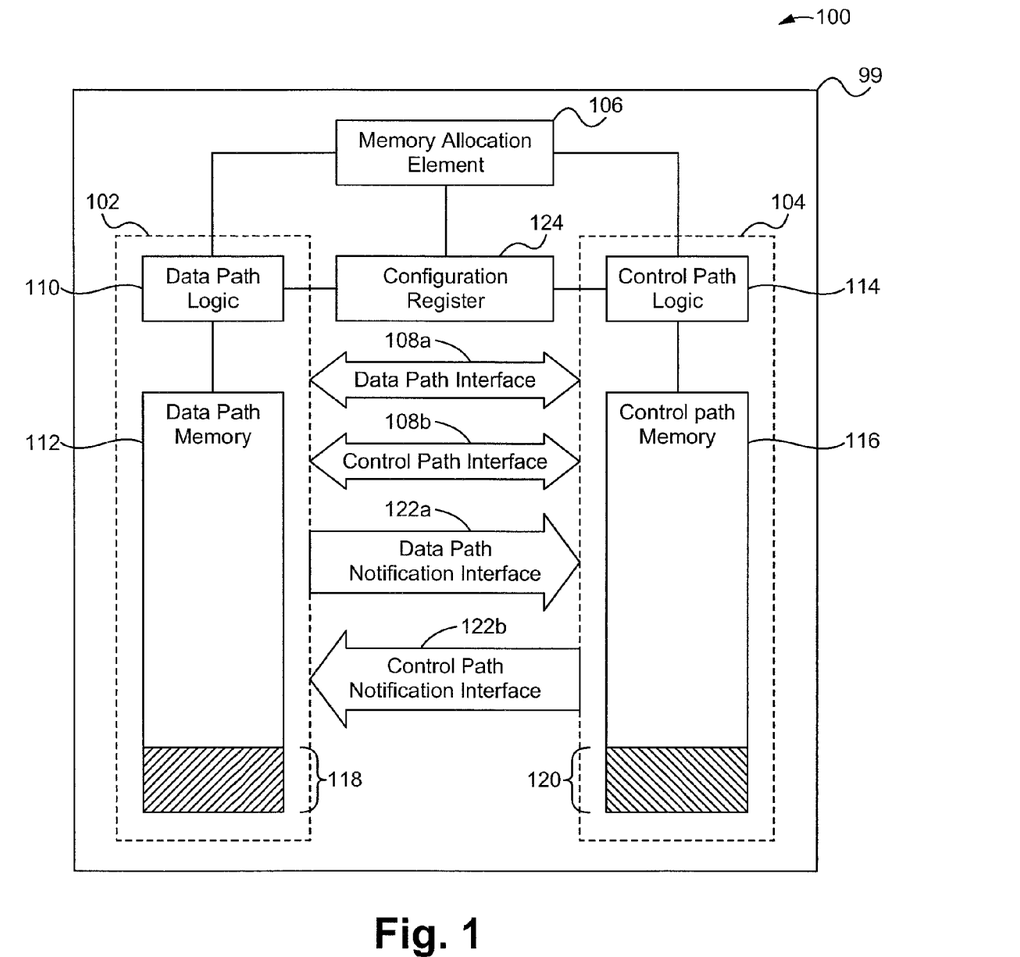
FIG. 1 illustrates a packet processing system on a packet processing device according to some embodiments.

FIG. 1 illustrates a packet processing system 100 on a packet processing device 99 according to some embodiments. As shown in FIG. 1, the system 100 comprises a datapath subsystem 102, a control path subsystem 104, a memory allocation element 106 and a configuration register 124 communicatively coupled together via one or more networks (e.g. buses/interfaces). Alternatively, the configuration register 124 is able to be omitted or incorporated into the memory allocation element 106 and/or one or both of the datapath subsystem 102 and the control path subsystem 104. For example, each of the subsystems 102, 104 and/or the memory allocation element 106 are able to have separate configuration registers 112. Similarly, in some embodiments the interfaces 122a, 122b are able to be omitted. The packet processing device 99 is able to be a packet processing circuit, microchip and/or a die. For example, the device 99 is able to be a switch microchip (e.g. top of rack switch) for a data center or other type of packet processing circuit or application specific integrated circuit. In some embodiments, the device 99 is a software defined network programmable microchip that is able to be programmed or customized to adjust the manner in which packets are processed. Alternatively, the device 99 is able to be other types of packet processing devices known in the art. In some embodiments, the memory allocation element 106 is actually two separate memory allocation elements. One allocation element dedicated and communicatively coupled to the datapath subsystem 102 and one allocation element dedicated and communicatively coupled to the control path subsystem 104. In such embodiments, these separate allocation elements are able to operate independently of each other and communicate with each other (e.g. via the notification interfaces 122a, 122b). Further, in such embodiments the separate allocation elements are able to be a part of (not outside of) their respective subsystem 102, 104.

The datapath subsystem 102 comprises datapath logic 110 communicatively coupled with a non-transitory computer readable datapath memory 112. The control path subsystem 104 comprises control path logic 114 communicatively coupled with a non-transitory computer readable control path memory 116. The control path subsystem 104, via the control path logic 114, performs the matching of a subset of the packet data of an incoming packet (usually in the form of a hash) against the contents of one or more tables stored on the control path memory 116. The match is able to be of the form of exact match or longest-prefix match, and the result of the match is used to decide which actions to perform on the packet (e.g. modifications to the header, destinations where the packet is to be output to). The datapath subsystem 102, via the datapath logic 110, stores the incoming packets into the datapath memory 112, and retrieves the packet data of the processed packets from the datapath memory 112 when they are ready to be output.

The memory allocation element 106 is communicatively coupled with the datapath subsystem 102 and the control path subsystem 104 for receiving requests for additional memory from one or both of the subsystems 102, 104. For example, one or both of the datapath logic 110 and the control path logic 114 are able to send such requests to the memory allocation element 106 based on if the memory usage of one of the memories 112, 116 meets a threshold or different thresholds. As a result, the memory allocation element 106 is able to dynamically or statically allocate either a portion 118 of the datapath memory 112 to the control path subsystem 104 or a portion 120 of the control path memory 116 to the datapath subsystem 112 as described in detail below. Alternatively, instead of in response to requests, the memory allocation element 106 is able to monitor the memory usage of the datapath memory 112 and the control path memory 116 and automatically dynamically or statically allocate either the portion 118 of the datapath memory 112 to the control path subsystem 104 or the portion 120 of the control path memory 116 to the datapath subsystem 112 based on if the memory usage of one of the memories 112, 116 meets a threshold or different thresholds. In any case, the element 106 is able to ensure that both portions 118 and 120 are never allocated simultaneously because that "added" memory would be balance out by the "subtracted" memory in each subsystem 102, 104 making the allocation pointless.

In embodiments wherein each subsystem 102, 104 has a separate dedicated memory allocation element, the dedicated memory allocation elements are able to operate similarly to the memory allocation element 106 as described above except that they only receive requests from their dedicated subsystem 102, 104. Thus, each allocation element monitors the state of both subsystems 102, 104 (e.g. which if any of the portions 118, 120 are in use/available and/or which portions 118, 120 are currently dedicated to which subsystems 102, 104) via local communication and communication with the other subsystem 102, 104 (e.g. via notification interfaces 122a, 122b or other interfaces between the subsystems 102, 104). Accordingly, when a local request is received the memory allocation element for that subsystem 102, 104 is able to grant or deny the request based on the current state of both subsystems 102, 104, wherein if it decided to grant the request it notifies the memory allocation element of the other subsystem 102, 104 such that both allocation elements reflect the new current state and the memory is reallocated according to the request. In any of the embodiments, the datapath logic 110, the control logic 114 and/or the memory allocation element 106 are able to comprise hardware, software or a combination of hardware and software configured to perform the functions of the associate subsystems 102, 104 or the memory allocation functions as described herein, wherein the software is stored on a non-transitory computer readable medium of the device 99.

The network is able to comprise a plurality of wide or narrow interfaces or buses that wired and/or wirelessly communicatively couple together the components of the system 100 for transmitting packet data and/or control signals between the components. In particular, as shown in FIG. 1, the network includes a datapath interface or bus 108a and a control path interface or bus 108b that each communicatively couple together the datapath subsystem 102 and the control path subsystem 104. For example, each interface 108a, 108b is able to comprise one or a plurality of buses coupled with datapath and/or control path ports. As a result, the datapath logic 110 is able to use the datapath interface 108a to read and write datapath packet data (and any associated command messages) to the control path logic 114 and thus the control path memory 116, and similarly, the control path logic 114 is able to use the control path interface 108b to read and write control path packet data (and any associated command messages) to the datapath logic 110 and thus the datapath memory 112. The number of buses and/or ports per interface 108a, 108b is able to be equal to the number of input ports of the portions of the memory 112, 116 to which they are able to access such that each of the ports are able to be accessed in parallel each cycle. Alternatively, more or less buses and/or ports are able to comprise each interface 108a, 108b such that arbitration is necessary between a single bus/port and a plurality of read/write ports of the associated memory or a single read or write port and a plurality of buses/ports of the interfaces 108a, 108b. Additionally, in some embodiments the datapath interface 108a and the control path interface 108b are able to be combined into a single interface such that only one of the control path subsystem 104 and the datapath subsystem 102 are able to utilize the single interface at a time.

Further, as shown in FIG. 1, the network is able to include a datapath notification interface 122a and a control notification interface 122b that each communicatively couple together the datapath subsystem 102 and the control path subsystem 104. Each interface 122a, 122b is able to comprise one or a plurality of buses. In particular, the notification interfaces 122a, 122b are able to be used by each of the subsystems 102, 104 to notify the other subsystem 102, 104 when the portion 118, 120 of the local memory 112, 116 is in use or no longer in use. This is beneficial in the case of dynamic memory allocation operation where local use of the portion 118, 120, even if it has been allocated, is able to occur at any time such that the other subsystem 102, 104 needs to be notified that any data stored on the remote portion 118, 120 has been lost. Alternatively, the interfaces 122a, 122b are able to be omitted. For example, the interfaces 122a, 122b are able to be unnecessary in the case of static memory allocation because the subsystems 102, 104 are not able to use local portions 118, 120 once they have been allocated to the other subsystem 102, 104.

The configuration register 124, regardless of where or how many are located on the system 100, stores configuration data that indicates to one or both of the subsystems 102, 104 how the memories, including the portions 118, 120 are currently allocated amongst the subsystems 102, 104. In some embodiments, the memory allocation element 106 generates and/or updates the configuration data. Alternatively, one or more of the datapath logic 110, the control path logic 114 and/or the memory allocation element 106 are able to individually or in combination generate and/or update the configuration data within the configuration register 124.

Figure 2:
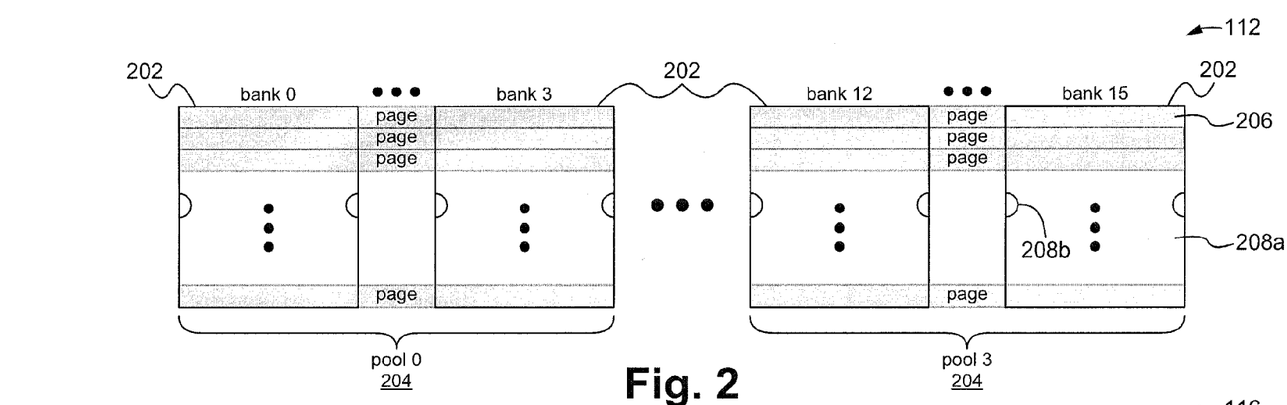
FIG. 2 illustrates a more detailed view of the datapath memory according to some embodiments.

FIG. 2 illustrates a more detailed view of the datapath memory 112 according to some embodiments. As shown in FIG. 2, the datapath memory 112 comprises a plurality of memory banks 202 each having one or more read ports 208a and one or more write ports 208b. Although as illustrated in FIG. 2 the memory 112 comprises 16 banks 202 and each of the banks 202 only have a single read port 208a and a single write port 208b, more or less of banks 202 each comprising more or less of read and/or write ports 208a, 208b are contemplated. Groups of one or more of these memory banks 202 are able to comprise a pool of banks 204. Although as shown in FIG. 2, each pool 204 comprises four banks 202, one or more of the pools 204 are able to comprise more or less banks 202.

When the datapath packet data of incoming packets is stored on the datapath memory 112, it is stored on one or more pages 206. Each of these pages 206 map to a portion of one of the pools 204, and in particular, to a portion of the plurality of the memory banks 202 forming the one of the pools 204. For example, as shown in FIG. 2, each of the pages 206 map to portions of four of the banks 202. Alternatively, the pages 206 are able to map to portions of more or less banks 202. Accordingly, all of the pools 204 are logically divided or apportioned amongst a plurality of the pages 206 such that together the pages 206 map to every portion of the datapath memory 112. As a result, when datapath packet data is stored on a page 206, instead of being all stored sequentially in the same location, the datapath packet data is distributed across multiple banks 202 that are mapped to by the page 206. In some embodiments, the datapath memory is a static random access memory (SRAM). Alternatively, the datapath memory 112 is able to comprise a content-addressable memory (CAM), a ternary content-addressable memory (TCAM), a random access memory (RAM), a static random access memory (SRAM), other types of memory known in the art or combinations thereof.

In some embodiments, the portion 118 of the datapath memory 112 comprises the entirety of one or more of the banks 202 (e.g. a pool 204 of the banks 202). Alternatively, the portion 118 of the datapath memory 112 is able to comprise only one or more pages 206 of one or more of the banks 202. For example, the portion 118 is able to comprise a fifth of the pages 206 of each of the banks 202. Alternatively, the portion 118 is able to map to other combinations of pages 206, banks 202 and/or pools 204 of the datapath memory 112. In some embodiments, the portion 118 is a contiguous logical chunk of space within the datapath memory 112. Alternatively, the portion 118 is able to be discontinuous. Further, the portion 118 is able to be any fraction of the total datapath memory 112, wherein the fraction is able to be predetermined or dynamically determined by the memory allocation element 106.

Figure 3:
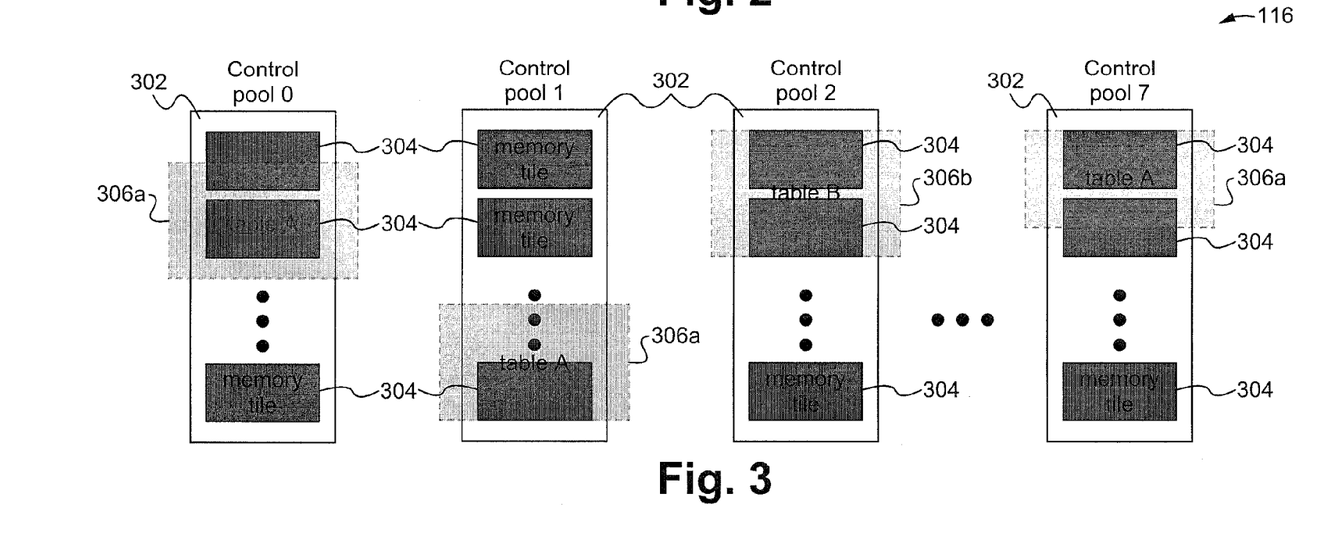
FIG. 3 illustrates a more detailed view of the control path memory according to some embodiments.

FIG. 3 illustrates a more detailed view of the control path memory 116 according to some embodiments. As shown in FIG. 3, the control path memory 116 comprises one or more control pools 302 each including one or more tiles 304. Although as shown in FIG. 3, the control path memory 116 comprises eight pools 302 each having three tiles 304, more or less pools 302 each having more or less tiles 304 are contemplated. Each control pool 302 is able to support multiple parallel read operations and/or write operations (e.g. one or more per tile 304). Each control pool 302 is able to be the same size or different sizes and forms its own local address space from first memory tile 304 of the pool 302 to last memory tile 304 of the pool 302. As also shown in FIG. 3, generally the control path memory 116 stores a plurality of logic or match tables 306a, 306b that are able to span one or more tiles 304 of one or more of the pools 302. As a result this spanning, the control path system 104 is able to provide improved memory utilization for both exact match tables 306 and longest prefix matching tables 306. In some embodiments, within each pool 302, a table 306 occupies a contiguous portion of the entire pool 302. In some embodiments, the control path memory 116 is a static random access memory (SRAM). Alternatively, the control path memory 116 is able to comprise a content-addressable memory (CAM), a ternary content-addressable memory (TCAM), a random access memory (RAM), a static random access memory (SRAM), other types of memory known in the art or combinations thereof.

In some embodiments, the portion 120 of the control path memory 116 comprises the entirety of one or more of the control pools 302. Alternatively, the portion 120 of the control path memory 116 is able to comprise only one or more tiles 304 of one or more of the control pools 302. For example, the portion 120 is able to comprise a fifth of the tiles 304 of each of the control pools 302. Alternatively, the portion 120 is able to map to other combinations of tiles 304 and/or control pools 302 of the control path memory 116. In some embodiments, the portion 120 is a contiguous logical chunk of space within the control path memory 116. Alternatively, the portion 120 is able to be discontinuous. Further, the portion 120 is able to be any fraction of the total control path memory 116, wherein the fraction is able to be predetermined or dynamically determined by the memory allocation element 106.

In operation, the system 100 is able to statically share memory by either allocating the portion 118 of the datapath memory 112 to the control path subsystem 104 or the portion 120 of the control path memory 116 to the datapath subsystem 112. In particular, as described above, one or both of the datapath logic 110 and the control path logic 114 are able to send request for additional memory space to the memory allocation element 106 based on if the memory usage of one of the memories 112, 116 meets a threshold or different thresholds. For example, the threshold is able to be a quantity of the total memory space (e.g. 90%, 100% or other percentages) that is currently in use, the threshold is able to be based on the quantity of total memory space that is currently in use and a rate at which the quantity of the total memory space (e.g. 90%, 100% or other percentages) that is currently in use is changing (e.g. increasing), and/or other indicators of memory space usage. Further, the threshold for the datapath memory 112 is able to be a different or the same amount as the threshold for the control path memory 116.

Upon receiving a request, if neither of the portions 118, 120 are currently allocated and the portion 118, 120 identified in the request is not currently in use by the local subsystem 102, 104, the memory allocation element 106 is able to allocate the portion 118, 120 identified in the request. For example, if the request is from the datapath subsystem 102, the portion 120 will be from the control path memory 116 and if the request is from the control path subsystem 104, the portion 118 will be from the datapath memory 112. The allocation is able to comprise notifying both the control path and the datapath logic 110, 114 that the portion 118, 120 has been allocated such that the subsystem 102, 104 that was allocated the portion 118, 120 is able to begin using the portion 118, 120 and the other subsystem 102, 104 is able to refrain from using the portion 118, 120. At the same time, the configuration register 124 is able to be updated/filled with configuration data indicating the allocation of the portion 118, 120. In some embodiments, the portions 118, 120 are predefined. Alternatively, the memory allocation element 106 is able to determine the portions 118, 120 based on the memory usage of one or both of the memories 112, 116.

If multiple requests are received, the memory allocation element 106 is able to arbitrate between the requests. For example, the element 106 is able to grant the request received first, the request from the subsystem 102, 104 that is currently exceeding the threshold by a greater quantity, the request from the higher priority of the subsystems 102, 104 (e.g. the datapath subsystem 102 or the control path subsystem 104) and/or a combination thereof. Alternatively, the element 106 is able to grant no requests if multiple request are received because it indicates that neither subsystem 102, 104 is in a position to sacrifice their portions 118, 120 to the other subsystem 102, 104. Alternatively or in addition, as described above, instead of in response to requests, the memory allocation element 106 is able to monitor the memory usage of the datapath memory 112 and the control path memory 116 and automatically dynamically or statically allocate either the portion 118 of the datapath memory 112 to the control path subsystem 104 or the portion 120 of the control path memory 116 to the datapath subsystem 112 based on if the memory usage of one of the memories 112, 116 meets the threshold or different thresholds.

Once one of the portions 118, 120 has been allocated, the subsystem 102, 104 that was allocated the portion 118, 120 utilizes the associated interface 108a, 108b to write into and/or read out the datapath or control path packet data from the portion 118, 120 as needed. Specifically, the logic 110, 114 that previously "owned" the allocated portion 118, 120 is able to receive one or more read/write ports from the logic 110, 114 that is currently allocated the portion 118, 120, which are used to access the allocated portion 118, 120 via the associated interface 108a, 108b of the logic 110, 114 currently allocated the portion 118, 120.

Depending on how the allocated portion 118, 120 was distributed within the memory 112, 116, the logic 110, 114 to which it is allocated needs to access the proper locations. For example, if the portion 118 is distributed within the memory 112 such that it represents a pool 204 of banks 202 and is allocated to the control path subsystem 104, the number of read/write ports from the control path logic 114 are able to be mapped to the entirety of the pool 204 of banks 202 of the portion 118. Alternatively, if the portion 118 is distributed within the memory 112 such that it represents one or more pages 206 (but not all pages) on one of more of the banks 202 and is allocated to the control path subsystem 104, the number of read/write ports from the control path logic 114 are able to be not mapped to all of the banks 202 of the portion 118, but rather only the pages of the banks 202 of the portion 118. Similarly, if the portion 120 is allocated to the datapath system 102, the number of read/write ports from the datapath logic 110 are able to be only mapped to the pools 302 or tiles 304 of the pools 302 that are a part of the portion 120. Finally, if the number of read/write ports supplied do not match the number of read/write ports associated with the portion 118, 120, the local logic 110, 114 is able to multiplex or arbitrate between the read/write ports of the other subsystem 102, 104 and the read/write ports associated with the allocated portion 118, 120.

At the same time, the subsystem 102, 104 where the allocated portion 118, 120 is located is configured to facilitate the use of the portion 118, 120 by the other subsystem 102, 104 to write in or read out the data (e.g. control path packet data (e.g. matching tables) or the datapath packet data (e.g. the packet data itself)) of the other subsystem 102, 104. For example, this facilitation is able to be performed in the same manner as if the use of the allocated portion 118, 120 was still local instead of from the other subsystem 102, 104. Similarly, the other subsystem 102, 104 that was allocated the portion 118, 120 is able to treat the allocated portion 118, 120 as if it was an additional one or more banks 202 and/or one or more pages 206 in each bank 202 if the other subsystem 102, 104 is the datapath subsystem 102, or as if it was one or more control pools 302 and/or one or more tiles 304 in each pool 302 if the other subsystem 102, 104 is the control path subsystem 104. Further, this treating of the allocated portion 118, 120 as additional local memory is able to disregard the distribution of the allocated portion 118, 120 within its local memory 112, 116. For example, memory space from two different banks 202 or pages 206 of the portion 118 are able to be treated as a single tile 304. As a result, for example, tables 306a, 306b from the control path subsystem 104 are able to be distributed across both local tiles 304 of local memory pools 302 and the additional "tiles" or "pools" of the allocated portion 118. Indeed, in some embodiments the only difference in operation of the other subsystem 102, 104 that was allocated the portion 118, 120 is the use of the interface 108a, 108b (and the associated ports) and/or the prioritization of the local memory 112, 116 before use of the allocated portion 118, 120. Specifically, the other subsystem 102, 104 is able to only use the allocated portion 118, 120 if the local memory 112, 116 is full or otherwise unable to be used for the local datapath or control path packet data. This is beneficial because the allocated portion 118, 120 will likely have a greater access/use latency than the local memory 112, 116 such that it is more efficient to use the local memory 112, 116 first, before using any of the portion 118, 120.

If the operation is a static allocation mode of operation (e.g. without use of the notification interfaces 122a, 122b), the memory allocation element 106 is configured to only grant a single allocation request. Subsequently, once one of the portions 118, 120 has been allocated, the local subsystem 102, 104 where the allocated portion 118, 120 is located is prevented from using the portion 118, 120 even if the local subsystem 102, 104 has used up or is running out of the remainder of the local memory 112, 116. In other words, during a static allocation mode of operation, once the portion 118, 120 is allocated, it cannot be de-allocated by the local "formerly owning" subsystem 102, 104 of the portion 118, 120. Indeed, in some embodiments once one of the portions 118, 120 has been allocated, it cannot be de-allocated nor is the other portion able to be allocated. As a result, in such embodiments only a single allocation will ever be made and the system 100 continually operates with the new memory allocation.

Alternatively, in some embodiments although the local subsystem 102, 104 is not able to initiate de-allocation, de-allocation is able to be performed by the memory allocation element 106 and/or the remote subsystem 102, 104 that was allocated the portion 118, 120. Specifically, in such embodiments the allocated portion 118, 120 is able to be de-allocated by the memory allocation element 106 based on a reconfiguration trigger. The reconfiguration trigger is able to be one or more of: a system reset being initiated, a request by the local "formerly owning" subsystem 102, 104 if the portion 118, 120 is not currently in use by the remote "currently owning" subsystem 102, 104, a de-allocation message from the remote "currently owning" subsystem 102, 104 indicating that the portion 118, 120 is not currently in use and no longer needed, a determination by the memory allocation element 106 that the portion 118, 120 is not currently in use and no longer needed by the remote "currently owning" subsystem 102, 104, after a predetermined time period, and/or at predetermined periodic intervals. For example, if the memory allocation element 106 determines or is notified by the remote "currently owning" subsystem 102, 104 that the allocated portion 118, 120 is no longer in use, the element 106 is able to deallocate the allocated portion 118, 120. In particular, in such an example no data is lost or corrupted because the deallocated portion 118, 120 is no longer in use. The de-allocation is able to be substantially similar to the allocation, wherein the element 106 notifies the subsystems 102, 104 of the memory allocation (e.g. neither portion 118, 120 is currently allocated) and the configuration data of the configuration register 124 is updated accordingly. Then after a reconfiguration trigger results in the de-allocation, the memory allocation element 106 returns to waiting for any requests for allocation and will only grant a single request (if neither of the portions 118, 120 are currently allocated and the portion 118, 120 identified in the request is not currently in use by the local subsystem 102, 104). Accordingly, the static allocation mode of operation is able to provide the advantage of enabling adjustment of the system 100 to the current memory needs.

If the operation is a dynamic allocation mode of operation (e.g. with use of the notification interfaces 122a, 122b), after an allocation has occurred, the local "formerly owning" subsystem 102, 104 is able to unilaterally deallocate the allocated portion 118, 120 at any time for local use. Indeed, because this unilateral deallocation is able to result in the loss or corruption of some or all of the data stored on the allocated portion 118, 120 from the remote subsystem 102, 104, the local subsystem 102, 104 uses the notification interface 122a, 122b to notify the remote subsystem 102, 104 that the allocated portion 118, 120 is now being used locally (i.e. has been deallocated). This notification enables to remote subsystem 102, 104 to operate as if all data stored on the previously allocated portion 118, 120 has been lost.

For example, in the case of the datapath subsystem 102, the packets of the datapath data stored on the previously allocated portion 120 are treated as corrupted or dropped packets. In the case of the control path subsystem 104, the tables 306 stored on the previously allocated portion 118 are treated as lost and the subsystem 104 is configured to repopulate the tables 306 either in the control path memory 116 or in the previously allocated portion 118 if it is subsequently reallocated to the control path subsystem 104. Additionally, in some embodiments in the case of the datapath subsystem 102, as the datapath packet data is stored, the datapath logic 110 associates tags with each page 206 of datapath packet data stored on the allocated portion 120 such that the tags identify pages of remotely stored datapath packet data. As a result, when a deallocation occurs (e.g. unilaterally by the control path logic 114) the datapath logic 110 is able to determine which pages 206 of datapath packet data have been lost using the tags and treat that datapath packet data as corrupted and/or lost. Indeed, this tagging is able to be repeated each subsequent time pages 206 of datapath packet data is stored on the portion 120.

The memory allocation unit 106 is able to operate similarly to in the static mode of operation except that, like a deallocation via a reconfiguration trigger, the unilateral deallocation via the local subsystem 102, 104 enables the memory allocation unit 106 to continue to receive requests for memory allocation and to reallocate one of the portions 118, 120 if neither of the portions 118, 120 are currently allocated and the portion 118, 120 identified in the request is not currently in use by the local subsystem 102, 104. Indeed, in some embodiments the memory allocation unit 106 is able to utilize the interfaces 122a, 122b to determine if the portion 118, 120 identified in the request is not currently in use by the local subsystem 102, 104. In other words, the dynamic allocation mode of operation is able to provide the benefit of enabling multiple dynamically implemented allocations, deallocations and re-allocations based on the changing needs of the system 100. In some embodiments, the dynamic mode of operation is able to also utilize deallocations based on reconfiguration triggers as described above. Alternatively, such deallocations are able to be omitted from the dynamic allocation mode of operation.

Figure 4:
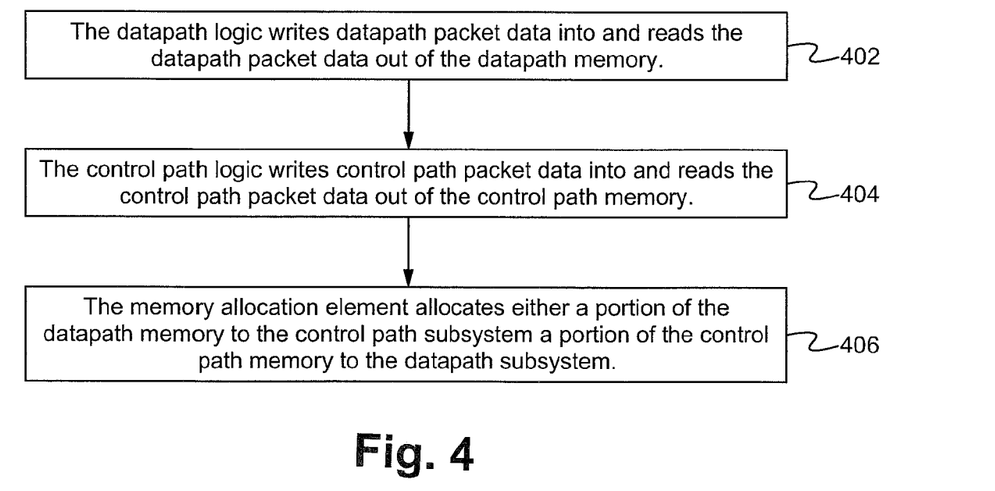
FIG. 4 illustrates a method of operating a packet processing system on a packet processing device according to some embodiments.

FIG. 4 illustrates a method of operating a packet processing system 100 on a packet processing device 99 according to some embodiments. As shown in FIG. 4, the datapath logic 110 writes datapath packet data into and reads the datapath packet data out of the datapath memory 112 at the step 402. The control path logic 114 writes control path packet data into and reads the control path packet data out of the control path memory 116 at the step 404. Steps 402 and 404 are able to occur simultaneously, concurrently, separately and/or in any order. In some embodiments, the method comprises an initial static configuration of the data allocation between the two subsystems 102, 104 wherein the default or initial data allocation state is assigned. In some embodiments, the datapath logic 110 and/or the control path logic 114 send requests for a portion 118, 120 of the memory 112, 116 to be allocated to the memory allocation element 106. The memory allocation element 106 allocates either a portion 118 of the datapath memory 112 to the control path subsystem 104 a portion 120 of the control path memory 116 to the datapath subsystem 102 at the step 406. Specifically, the element 106 is able to allocate the portion 118, 120 if neither of the portions 118, 120 are currently allocated and the portion 118, 120 identified in the request is not currently in use by the local subsystem 102, 104. The memory allocation element 106 is also able to ensure that the portions 118, 120 are never both allocated concurrently. As a result, subsystem 102, 104 that was allocated the portion 118, 120 is able to treat the portion 118, 120 one or more additional memory banks 202 and/or pages 206 or one or more additional pools 302 and/or tiles 304 for the purpose of writing and reading data. Accordingly, the method provides the advantage of enabling the re-balancing of memory space based on current needs of the system 100.

In embodiments wherein the memory allocation element 106 comprises a separate allocation element for each subsystem 102, 104, the separate allocation elements are able to concurrently, simultaneously, separately and/or in any order receive local requests, grant requests, and/or monitor/update the current memory allocation/use status of both subsystems 102, 104 to reflect any changes locally or as indicated from the other memory allocation element or subsystem 102, 104. In some embodiments, the remote subsystem/logic send read/write commands to the local subsystem/logic via the interface 108a, 108b and the local subsystem/logic facilitates the writing of the data into and the reading of the data out of the allocated portion 118, 120 by the remote subsystem/logic. In some embodiments, the datapath logic 110, the control path logic 114 and/or the element 106 generate, store and/or update configuration data indicating the current allocation of the portions 118, 120 within the configuration registers 124. In some embodiments, the subsystem 102, 104 that has been allocated a portion 118, 120 prioritizes use of local memory 112, 116 before utilizing the allocated portion 118, 120. In some embodiments, the local subsystem 102, 104 refrains or is prevented from utilizing the portion 118, 120 once it has been allocated. Alternatively, the local subsystem 102, 104 is able to unilaterally utilizing the portion 118, 120 even if it is currently allocated and/or storing data. In some embodiments, the memory allocation element 106 is able to deallocate an allocated portion 118, 120 based upon the occurrence of a reconfiguration trigger. Alternatively, the portion 118, 120 once allocated cannot be deallocated by the element 106, the local subsystem 102, 104 and/or the remote subsystem 102, 104. In some embodiments, the local subsystem/logic indicates to the remote subsystem/logic when the local portion 118, 120 is currently in use via the interface 122a, 122b. In some embodiments, the datapath logic 110 maintaining tags identifying which pages 206 of the datapath packet data is stored on the portion 120 of the control path memory 116.

The packet processing system described herein has numerous advantages. In particular, the system provides the advantage of dynamically or statically improving the performance of the system by either allowing more packets to be buffered within the datapath memory (minimizing packet drops and/or throttling to the sender of packets) or more rules to be matched against within the control path memory (allowing more features to be implemented in the system). In particular, the dynamic memory allocation enables the system to adjust to various needs of the device as they change with time. Further, the static memory allocation still provides at least a one time adjustment to the memory allocation balance in order to balance the performance of the system without needing the overhead required for dynamic adjustments.

While the invention has been described with reference to numerous specific details, one of ordinary skill in the art will recognize that the invention can be embodied in other specific forms without departing from the spirit of the invention. For example, although the different methods and operations described herein describe a particular order of steps, other orders are contemplated as well as the omission of one or more of the steps and/or the addition of one or more new steps. Moreover, although the methods and operations above are described herein separately, one or more of the methods and operations are able to be combined (in whole or part). Thus, one of ordinary skill in the art will understand that the invention is not to be limited by the foregoing illustrative details, but rather is to be defined by the appended claims.

We claim:

1. A packet processing system on a packet processing device, the system comprising:
a datapath subsystem including datapath logic and a non-transitory computer-readable datapath memory that is communicatively coupled with the datapath logic and logically organized into a plurality of memory banks, wherein the datapath logic controls the writing of datapath packet data into and the reading of the datapath packet data out of the datapath memory;
a control path subsystem including control path logic and a non-transitory computer-readable control path memory that is communicatively coupled with the control path logic and logically organized into a plurality of control memory pools that each comprise a plurality of tiles, wherein the control path logic controls the writing of control path packet data into and the reading of the control path packet data out of the control path memory; and
a memory allocation element having a datapath unit communicatively coupled with the datapath subsystem and a control path unit communicatively coupled with the control path subsystem, wherein the control path unit is configured to allocate a portion of the datapath memory to the control path subsystem such that the portion of the datapath memory is used by the control path subsystem to store the control path packet data and the datapath unit is configured to allocate a portion of the control path memory to the datapath subsystem such that the portion of the control path memory is used by the datapath subsystem to store the datapath packet data, wherein the memory allocation element ensures that the portion of the control path memory and the portion of the datapath memory are never both allocated concurrently.

2. The system of claim 1, wherein the portion of the datapath memory is one or more of the memory banks of the datapath memory.

3. The system of claim 1, wherein the memory banks are logically divided into a plurality of pages that each span two or more of the memory banks, and further wherein the portion of the datapath memory is one or more of the pages of the datapath memory.

4. The system of claim 3, further comprising one or more buses communicatively coupling the datapath logic to the control path logic, wherein both communicating with the datapath logic by the control path logic to use the portion of the datapath memory and communicating with the control path logic by the datapath logic to use the portion of the control path memory is performed over the buses.

5. The system of claim 4, wherein once the portion of the datapath memory is allocated to the control path subsystem, the control path subsystem treats the portion of the datapath memory as one or more additional control memory pools.

6. The system of claim 5, wherein once the portion of the control path memory is allocated to the data path subsystem, the data path subsystem treats the portion of the control path memory as one or more additional memory banks within the datapath memory or treats the portion of the control path memory as one or more additional pages within one or more of the memory banks.

7. The system of claim 6, further comprising a configuration register that stores memory configuration data indicating which if any of the control path memory is allocated to the datapath subsystem and which if any of the datapath memory is allocated to the control path subsystem.

8. The system of claim 7, wherein if the portion of the control path memory is allocated to the datapath subsystem, the datapath logic is configured to only utilize the portion of control path memory to store the datapath packet data if the datapath packet data is not able to be stored on the datapath memory.

9. The system of claim 8, wherein if the portion of the datapath memory is allocated to the control path subsystem, the control path logic is configured to only utilize the portion of the datapath memory to store the control path packet data if the control path packet data is not able to be stored on the control path memory.

10. The system of claim 9, wherein once the portion of the datapath memory is allocated to the control path subsystem, the datapath logic is unable to use the portion of the datapath memory for storing the datapath packet data and once the portion of the control path memory is allocated to the datapath subsystem, the control path logic is unable to use the portion of the control path memory for storing the control path packet data.

11. The system of claim 9, wherein even while the portion of the datapath memory is allocated to the control path subsystem, the datapath logic is configured to overwrite some or all of the control path packet data stored on the portion of the datapath memory if the portion of the datapath memory is necessary to store some or all of the datapath packet data and even while the portion of the control path memory is allocated to the datapath subsystem, the control path logic is configured to overwrite some or all of the datapath packet data stored on the portion of the control path memory if the portion of the control path memory is necessary to store some or all of the control path packet data.

12. The system of claim 11, further comprising a datapath memory availability line and a control path memory availability line that are each coupled between the control path subsystem and the datapath subsystem, wherein, independent of a request of an indication of whether the portion of the data path memory is currently in use by the datapath subsystem, the datapath logic indicates to the control path logic if the portion of the datapath memory is currently in use by the datapath subsystem via the datapath memory availability line and, independent of a request of an indication of whether the portion of the control path memory is currently in use by the control path subsystem, the control path logic indicates to the datapath logic if the portion of the control path memory is currently in use by the control path subsystem via the control path memory availability line.

13. The system of claim 12, wherein if the datapath logic overwrites the some or all of the control path packet data stored on the portion of the datapath memory, the datapath logic indicates to the control path logic that the portion of the datapath memory is currently in use by the datapath subsystem via the datapath memory availability line and the control path logic operates as if the some or all of the control path packet data has all been deleted, and if the control path logic overwrites the some or all of the datapath packet data stored on the portion of the control path memory, the control path logic indicates to the datapath logic that the portion of the control path memory is currently in use by the control path subsystem via the control path memory availability line and the datapath logic operates as if the some or all of the datapath packet data has all been deleted.

14. The system of claim 13, wherein the datapath logic is configured to maintain tags identifying which of the datapath packet data is stored on the portion of the control path memory.

15. The system of claim 14, wherein the control path unit and the datapath unit operate independently of each other.

16. A packet processing system on a packet processing device, the system comprising:
a datapath subsystem including datapath logic and a non-transitory computer-readable datapath memory that is communicatively coupled with the datapath logic and logically organized into a plurality of memory banks, wherein the datapath logic controls the writing of datapath packet data into and the reading of the datapath packet data out of the datapath memory;
a control path subsystem including control path logic and a non-transitory computer-readable control path memory that is communicatively coupled with the control path logic and logically organized into a plurality of control memory pools that each comprise a plurality of tiles, wherein the control path logic controls the writing of control path packet data into and the reading of the control path packet data out of the control path memory; and
a memory allocation element having a datapath unit communicatively coupled with the datapath subsystem and a control path unit communicatively coupled with the control path subsystem, wherein the control path unit is configured to allocate a portion of the datapath memory to the control path subsystem such that the portion of the datapath memory is used by the control path subsystem to store the control path packet data and the datapath unit is configured to allocate a portion of the control path memory to the datapath subsystem such that the portion of the control path memory is used by the datapath subsystem to store the datapath packet data, wherein, if the portion of the control path memory is allocated to the datapath subsystem, the control path logic is configured to facilitate the writing of datapath packet data into and the reading of the datapath packet data out of the portion of the control path memory, and if the portion of the datapath memory is allocated to the control path subsystem, the datapath logic is configured to facilitate the writing of control path packet data into and the reading of the control path packet data out of the portion of the datapath memory.

17. A memory allocation element stored on a non-transitory computer readable medium of a packet processing device, the memory allocation element having a control path unit configured to allocate a portion of a non-transitory computer-readable datapath memory to a control path subsystem such that the portion of the datapath memory is used by the control path subsystem to store control path packet data and a datapath unit configured to allocate a portion of a non-transitory computer-readable control path memory to a datapath subsystem such that the portion of the control path memory is used by a datapath subsystem to store datapath packet data, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory, wherein the memory allocation element ensures that the portion of the control path memory and the portion of the datapath memory are never both allocated concurrently.

18. The memory allocation element of claim 17, further comprising a configuration register that stores memory configuration data indicating which if any of the control path memory is allocated to the datapath subsystem and which if any of the datapath memory is allocated to the control path subsystem.

19. The memory allocation element of claim 18, wherein, independent of a request of an indication of whether the portion of the data path memory is currently in use by the datapath subsystem, the datapath logic indicates to the control path logic if the portion of the datapath memory is currently in use by the datapath subsystem and, independent of a request of an indication of whether the portion of the control path memory is currently in use by the control path subsystem, the control path logic indicates to the datapath logic if the portion of the control path memory is currently in use by the control path subsystem, and further wherein upon request for more memory space by the datapath subsystem, the datapath unit of the memory allocation element does not allocate the portion of the control path memory if the control path logic indicates that the portion of the control path memory is currently in use, and further wherein upon request for more memory space by the control path subsystem, the control path unit of the memory allocation element does not allocate the portion of the datapath memory if the datapath logic indicates that the portion of the datapath memory is currently in use.

20. The memory allocation element of claim 17, wherein once the portion of the datapath memory is allocated to the control path subsystem, the datapath logic is unable to use the portion of the datapath memory for storing the datapath packet data and once the portion of the control path memory is allocated to the datapath subsystem, the control path logic is unable to use the portion of the control path memory for storing the control path packet data.

21. A memory allocation element stored on a non-transitory computer readable medium of a packet processing device, the memory allocation element having a control path unit configured to allocate a portion of a non-transitory computer-readable datapath memory to a control path subsystem such that the portion of the datapath memory is used by the control path subsystem to store control path packet data and a datapath unit configured to allocate a portion of a non-transitory computer-readable control path memory to a datapath subsystem such that the portion of the control path memory is used by a datapath subsystem to store datapath packet data, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory, wherein even while the portion of the datapath memory is allocated to the control path subsystem, the datapath logic is configured to overwrite some or all of the control path packet data stored on the portion of the datapath memory if the portion of the datapath memory is necessary to store some or all of the datapath packet data and even while the portion of the control path memory is allocated to the datapath subsystem, the control path logic is configured to overwrite some or all of the datapath packet data stored on the portion of the control path memory if the portion of the control path memory is necessary to store some or all of the control path packet data.

22. The memory allocation element of claim 21, wherein the control path unit and the datapath unit operate independently of each other.

23. A method of operating a packet processing system on a packet processing device, the method comprising:

writing datapath packet data into and reading the datapath packet data out of a non- transitory computer readable datapath memory with datapath logic within a datapath subsystem, wherein the datapath memory is communicatively coupled with the datapath logic and logically organized into a plurality of memory banks;

writing control path packet data into and reading the control path packet data out of a non-transitory computer readable control path memory with control path logic within a control path subsystem, wherein the control path memory is communicatively coupled with the control path logic and logically organized into a plurality of control memory pools that each comprise a plurality of tiles;

allocating, with a memory allocation element having a datapath unit and a control path unit, either a portion of the datapath memory to the control path subsystem with the control path unit such that the portion of the datapath memory is used by the control path subsystem to store the control path packet data or a portion of the control path memory to the datapath subsystem with the datapath unit such that the portion of the control path memory is used by the datapath subsystem to store the datapath packet data, wherein the datapath unit is communicatively coupled with the datapath subsystem and the control path unit is communicatively coupled with the control path subsystem; and ensuring that the portion of the control path memory and the portion of the datapath memory are never both allocated concurrently with the memory allocation element.

24. The method of claim 23, wherein the portion of the datapath memory is one or more of the memory banks of the datapath memory.

25. The method of claim 23, wherein the memory banks are logically divided into a plurality of pages that each span two or more of the memory banks, and further wherein the portion of the datapath memory is one or more of the pages of the datapath memory.

26. The method of claim 25, wherein one or more buses communicatively couple the datapath logic to the control path logic, the method further comprising communicating over the buses with the datapath logic with the control path logic to use the portion of the datapath memory and communicating over the buses with the control path logic with the datapath logic to use the portion of the control path memory.

27. The method of claim 26, further comprising treating the portion of the datapath memory as one or more additional control memory pools with the control path subsystem once the portion of the datapath memory is allocated to the control path subsystem.

28. The method of claim 27, further comprising treating the portion of the control path memory as one or more additional memory banks within the datapath memory or treating the portion of the control path memory as one or more additional pages within one or more of the memory banks with the data path subsystem once the portion of the control path memory is allocated to the data path subsystem.

29. The method of claim 28, further comprising storing memory configuration data on a configuration register, the memory configuration data indicating which if any of the control path memory is allocated to the datapath subsystem and which if any of the datapath memory is allocated to the control path subsystem.

30. The method of claim 29, further comprising only utilizing the portion of control path memory to store the datapath packet data with the datapath logic if the datapath packet data is not able to be stored on the datapath memory if the portion of the control path memory is allocated to the datapath subsystem.

31. The method of claim 30, further comprising only utilizing the portion of the datapath memory to store the control path packet data with the control path logic if the control path packet data is not able to be stored on the control path memory if the portion of the datapath memory is allocated to the control path subsystem.

32. The method of claim 31, further comprising refraining from using the portion of the datapath memory for storing the datapath packet data with the datapath logic once the portion of the datapath memory is allocated to the control path subsystem, and refraining from using the portion of the control path memory for storing the control path packet data with the control path logic once the portion of the control path memory is allocated to the datapath subsystem.

33. The method of claim 31, further comprising overwriting some or all of the control path packet data stored on the portion of the datapath memory if the portion of the datapath memory is necessary to store some or all of the datapath packet data some or all of the control path packet data stored on the portion of the datapath memory if the portion of the datapath memory is necessary to store some or all of the datapath packet data with the datapath logic even while the portion of the datapath memory is allocated to the control path subsystem, and overwriting some or all of the datapath packet data stored on the portion of the control path memory if the portion of the control path memory is necessary to store some or all of the control path packet data with the control path logic even while the portion of the control path memory is allocated to the datapath subsystem.

34. The method of claim 33, wherein a datapath memory availability line and a control path memory availability line are each coupled between the control path subsystem and the datapath subsystem, the method further comprising, independent of a request of an indication of whether the portion of the data path memory is currently in use by the datapath subsystem, indicating to the control path logic with the datapath logic if the portion of the datapath memory is currently in use by the datapath subsystem via the datapath memory availability line, and, independent of a request of an indication of whether the portion of the control path memory is currently in use by the control path subsystem, indicating to the datapath logic with the control path logic if the portion of the control path memory is currently in use by the control path subsystem via the control path memory availability line.

35. The method of claim 34, further comprising, if the datapath logic overwrites the some or all of the control path packet data stored on the portion of the datapath memory, indicating to the control path logic with the datapath logic that the portion of the datapath memory is currently in use by the datapath subsystem via the datapath memory availability line and operating with the control path logic as if the some or all of the control path packet data has all been deleted, and, if the control path logic overwrites the some or all of the datapath packet data stored on the portion of the control path memory, indicating to the datapath logic with the control path logic that the portion of the control path memory is currently in use by the control path subsystem via the control path memory availability line and operating with the datapath logic as if the some or all of the datapath packet data has all been deleted.

36. The method of claim 35, further comprising maintaining tags identifying which of the datapath packet data is stored on the portion of the control path memory with the datapath logic.

37. The method of claim 36, wherein the control path unit and the datapath unit operate independently of each other.

38. A method of operating a packet processing system on a packet processing device, the method comprising:
    writing datapath packet data into and reading the datapath packet data out of a non-transitory computer readable datapath memory with datapath logic within a datapath subsystem, wherein the datapath memory is communicatively coupled with the datapath logic and logically organized into a plurality of memory banks;
    writing control path packet data into and reading the control path packet data out of a non-transitory computer readable control path memory with control path logic within a control path subsystem, wherein the control path memory is communicatively coupled with the control path logic and logically organized into a plurality of control memory pools that each comprise a plurality of tiles;
    allocating, with a memory allocation element having a datapath unit and a control path unit, either a portion of the datapath memory to the control path subsystem with the control path unit such that the portion of the datapath memory is used by the control path subsystem to store the control path packet data or a portion of the control path memory to the datapath subsystem with the datapath unit such that the portion of the control path memory is used by the datapath subsystem to store the datapath packet data, wherein the datapath unit is communicatively coupled with the datapath subsystem and the control path unit is communicatively coupled with the control path subsystem; and
    facilitating the writing of datapath packet data into and the reading of the datapath packet data out of the portion of the control path memory the control path logic if the portion of the control path memory is allocated to the datapath subsystem, and facilitating the writing of control path packet data into and the reading of the control path packet data out of the portion of the datapath memory with the datapath logic if the portion of the datapath memory is allocated to the control path subsystem.

39. A method of operating a memory allocation element having a datapath unit and a control path unit within a packet processing system on a packet processing device, the method comprising:
allocating either a portion of a non-transitory computer readable datapath memory to a control path subsystem with the control path unit such that the portion of the datapath memory is used by the control path subsystem to store control path packet data or a portion of a non-transitory computer readable control path memory to a datapath subsystem with the datapath unit such that the portion of the control path memory is used by the datapath subsystem to store datapath packet data, wherein the datapath unit is communicatively coupled with the datapath subsystem and the control path unit is communicatively coupled with the control path subsystem, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory; and
ensuring that the portion of the control path memory and the portion of the datapath memory are never both allocated concurrently with the memory allocation element.

40. The method of claim 39, further comprising storing memory configuration data on a configuration register, the memory configuration data indicating which if any of the control path memory is allocated to the datapath subsystem and which if any of the datapath memory is allocated to the control path subsystem.

41. The method of claim 40, wherein, independent of a request of an indication of whether the portion of the data path memory is currently in use by the datapath subsystem, the datapath logic indicates to the control path logic if the portion of the datapath memory is currently in use by the datapath subsystem and, independent of a request of an indication of whether the portion of the control path memory is currently in use by the control path subsystem, the control path logic indicates to the datapath logic if the portion of the control path memory is currently in use by the control path subsystem, the method further comprising, upon request for more memory space by the datapath subsystem, refraining from allocating the portion of the control path memory if the control path logic indicates that the portion of the control path memory is currently in use, and, upon request for more memory space by the control path subsystem, refraining from allocating the portion of the datapath memory if the datapath logic indicates that the portion of the datapath memory is currently in use.

42. The method of claim 41, wherein the control path unit and the datapath unit operate independently of each other.

43. A method of operating a memory allocation element having a datapath unit and a control path unit within a packet processing system on a packet processing device, the method comprising:
allocating either a portion of a non-transitory computer readable datapath memory to a control path subsystem with the control path unit such that the portion of the datapath memory is used by the control path subsystem to store control path packet data or a portion of a non-transitory computer readable control path memory to a datapath subsystem with the datapath unit such that the portion of the control path memory is used by the datapath subsystem to store datapath packet data, wherein the datapath unit is communicatively coupled with the datapath subsystem and the control path unit is communicatively coupled with the control path subsystem, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory, wherein even while the portion of the datapath memory is allocated to the control path subsystem, the datapath logic is configured to overwrite some or all of the control path packet data stored on the portion of the datapath memory if the portion of the datapath memory is necessary to store some or all of the datapath packet data and even while the portion of the control path memory is allocated to the datapath subsystem, the control path logic is configured to overwrite some or all of the datapath packet data stored on the portion of the control path memory if the portion of the control path memory is necessary to store some or all of the control path packet data.

44. A memory allocation element stored on a non-transitory computer readable medium of a packet processing device, the memory allocation element having a control path unit configured to allocate a portion of a non-transitory computer-readable datapath memory to a control path subsystem such that the portion of the datapath memory is used by the control path subsystem to store control path packet data and a datapath unit configured to allocate a portion of a non-transitory computer-readable control path memory to a datapath subsystem such that the portion of the control path memory is used by a datapath subsystem to store datapath packet data,
wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory, wherein, if the portion of the control path memory is allocated to the datapath subsystem, the control path logic is configured to facilitate the writing of datapath packet data into and the reading of the datapath packet data out of the portion of the control path memory, and if the portion of the datapath memory is allocated to the control path subsystem, the datapath logic is configured to facilitate the writing of control path packet data into and the reading of the control path packet data out of the portion of the datapath memory.

45. A method of operating a memory allocation element having a datapath unit and a control path unit within a packet processing system on a packet processing device, the method comprising:

allocating either a portion of a non-transitory computer readable datapath memory to a control path subsystem with the control path unit such that the portion of the datapath memory is used by the control path subsystem to store control path packet data or a portion of a non-transitory computer readable control path memory to a datapath subsystem with the datapath unit such that the portion of the control path memory is used by the datapath subsystem to store datapath packet data, wherein the datapath unit is communicatively coupled with the datapath subsystem and the control path unit is communicatively coupled with the control path subsystem, wherein the datapath subsystem includes both the datapath memory, which is logically organized into a plurality of memory banks, and the datapath logic, which controls the writing of datapath packet data into and the reading of the datapath packet data out of the datapath memory, and further wherein the control path subsystem includes both the control path memory, which is logically organized into a plurality of control memory pools that each comprise a plurality of tiles, and the control path logic, which controls the writing of control path packet data into and the reading of the control path packet data out of the control path memory, wherein, if the portion of the control path memory is allocated to the datapath subsystem, the control path logic is configured to facilitate the writing of datapath packet data into and the reading of the datapath packet data out of the portion of the control path memory, and if the portion of the datapath memory is allocated to the control path subsystem, the datapath logic is configured to facilitate the writing of control path packet data into and the reading of the control path packet data out of the portion of the datapath memory.

* * * * *